United States Patent
Chung et al.

(10) Patent No.: US 10,402,494 B2
(45) Date of Patent: Sep. 3, 2019

(54) SYSTEM AND METHOD FOR AUTOMATICALLY EXPANDING INPUT TEXT

(71) Applicant: Electronics and Telecommunications Research Institute, Daejeon (KR)

(72) Inventors: Eui Sok Chung, Daejeon (KR); Byung Ok Kang, Daejeon (KR); Ki Young Park, Daejeon (KR); Jeon Gue Park, Daejeon (KR); Hwa Jeon Song, Daejeon (KR); Sung Joo Lee, Daejeon (KR); Yun Keun Lee, Daejeon (KR); Hyung Bae Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 201 days.

(21) Appl. No.: 15/439,416

(22) Filed: Feb. 22, 2017

(65) Prior Publication Data

US 2018/0157640 A1 Jun. 7, 2018

(30) Foreign Application Priority Data

Dec. 6, 2016 (KR) .................. 10-2016-0165135

(51) Int. Cl.
G06F 17/27 (2006.01)
G06F 17/28 (2006.01)

(52) U.S. Cl.
CPC ...... *G06F 17/2775* (2013.01); *G06F 17/2881* (2013.01)

(58) Field of Classification Search
CPC ........................................... G06F 17/27

USPC ......................................... 704/500
See application file for complete search history.

(56) References Cited

U.S. PATENT DOCUMENTS

| 6,523,026 | B1* | 2/2003 | Gillis ............. G06F 16/3332 |
| 8,392,413 | B1* | 3/2013 | Grushetskyy ....... G06F 16/9535 707/727 |
| 8,805,840 | B1* | 8/2014 | Joshi ............. G06F 16/951 707/737 |

(Continued)

FOREIGN PATENT DOCUMENTS

CN 104346406 2/2015

OTHER PUBLICATIONS

Oriol Vinyals et al., "A Neural Conversational Model", International Workshop on Deep Learning, arXiv:1506.05869v3; Jul. 10-11, 2015.

(Continued)

*Primary Examiner* — Michael C Colucci
(74) *Attorney, Agent, or Firm* — Kile Park Reed & Houtteman PLLC

(57) ABSTRACT

Provided is a method of automatically expanding input text. The method includes receiving input text composed of a plurality of documents, extracting a sentence pair that is present in different documents among the plurality of documents, setting the extracted sentence pair as an input of an encoder of a sequence-to-sequence model, setting an output of the encoder as an output of a decoder of the sequence-to-sequence model and generating a sentence corresponding to the input, and generating expanded text based on the generated sentence.

20 Claims, 8 Drawing Sheets

(56) References Cited

U.S. PATENT DOCUMENTS

| | | | | |
|---|---|---|---|---|
| 9,020,204 | B2* | 4/2015 | Moden | G06T 7/285 |
| | | | | 382/107 |
| 2005/0108001 | A1* | 5/2005 | Aarskog | G06F 17/271 |
| | | | | 704/10 |
| 2007/0250497 | A1* | 10/2007 | Mansfield | G06F 16/36 |
| 2008/0250015 | A1 | 10/2008 | Guo et al. | |
| 2010/0070261 | A1* | 3/2010 | Jin | G06F 17/2755 |
| | | | | 704/2 |
| 2012/0011428 | A1* | 1/2012 | Chisholm | G06F 17/241 |
| | | | | 715/230 |
| 2013/0103695 | A1* | 4/2013 | Rarrick | G06F 17/2854 |
| | | | | 707/748 |
| 2013/0110493 | A1 | 5/2013 | Kim et al. | |
| 2015/0121290 | A1* | 4/2015 | Li | G06F 17/2785 |
| | | | | 715/780 |
| 2016/0042053 | A1* | 2/2016 | De Sousa Webber | |
| | | | | G06F 16/3338 |
| | | | | 707/739 |
| 2017/0053025 | A1* | 2/2017 | De Sousa Webber | |
| | | | | G06F 16/3347 |
| 2017/0316775 | A1* | 11/2017 | Le | G06F 16/3329 |
| 2017/0337268 | A1* | 11/2017 | Ait-Mokhtar | G06N 5/02 |
| 2018/0143760 | A1* | 5/2018 | Orr | G06F 3/04886 |
| 2018/0247012 | A1* | 8/2018 | Verzotto | G16B 30/00 |

OTHER PUBLICATIONS

Steffen Remus et al., "Domain-Specific Corpus Expansion with Focused Webcrawling", FG Language Technology Computer Science Department at Technische Universitat Darmstadt; LREC, May 23-28, 2016.

Jason Weston et al., "Memory Networks", arXiv:1410.3916v11; Conference paper at ICLR; ACL-IJCNLP; Jul. 26-31, 2015.

Ilya Sutskever et al., "Sequence to Sequence Learning with Neural Networks", NIPS, Dec. 8-13, 2014.

Ryan Kiros et al., "Skip-Thought Vectors", arXiv:1506.06726v1; University of Toronto, Canadian Institute of Advanced Research, Massachusetts Institute of Technology, Jun. 22, 2015.

Regina Barzilay et al., "Using Lexical Chains for Text Summarization", Mathematics and Computer Science Department at Ben Gurion University; ISTS, Jul. 11, 1997.

* cited by examiner

SYSTEM AND METHOD FOR AUTOMATICALLY EXPANDING INPUT TEXT

CROSS-REFERENCE TO RELATED APPLICATION

This application claims priority to and the benefit of Korean Patent Application No. 2016-0165135, filed on Dec. 6, 2016, the disclosure of which is incorporated herein by reference in its entirety.

BACKGROUND

1. Field

The present invention relates to a system and method for automatically expanding input text.

2. Discussion of Related Art

Basic research on a sequence-to-sequence learning algorithm based on a neural network was first applied to the field of machine translation. That is, in the paper "Sequence to sequence learning with neural networks," in Advances in neural information processing systems, 2014, presented by Sutskever, Ilya, Oriol Vinyals, and Quoc V. Le., an approach for teaching a Long Short-Term Memory (LSTM) encoder about an input sentence and an LSTM decoder about a translated sentence was first proposed for a pair of an input sentence and a translated sentence. This is an end-to-end approach that performs sentence embedding on a new input sentence through an encoder and generates a translated sentence by using a corresponding embedding value as an input of a decoder.

Such an approach has recently been utilized to learn a conversation model to build a chat-bot. Also, such an approach may be utilized to generate a response sentence for answering a specific question when a dialog sequence of a movie script is input to an encoder or decoder.

However, a conventional technique has problems in that there should be learning data such as a pair of translated sentences or a pair of a question and an answer and there is no method of providing learning sentences corresponding to an encoder and a decoder in general text.

In order to solve these problems, there is a need for a technology for generating an input and an output of a sequence-to-sequence model by applying a word chain network technique.

In this context, U.S. Pat. No. 7,805,288 entitled "CORPUS EXPANSION SYSTEM AND METHOD THEREOF" discloses a technology for expanding seeds to expand corpora and building a corpus expansion system by utilizing the expanded seeds.

SUMMARY

The present invention provides a system and method for automatically expanding input text by utilizing a word chain network technique and a sequence-to-sequence model.

However, the technical objects of the invention are not limited to the aforementioned technical object, and it should be obvious to those skilled in the art that there may be other technical objects from the following description.

According to an aspect of the present invention, there is provided a method of automatically expanding input text, the method including receiving input text composed of a plurality of documents; extracting a sentence pair that is present in different documents among the plurality of documents; setting the extracted sentence pair as an input of an encoder of a sequence-to-sequence model; setting an output of the encoder as an output of a decoder of the sequence-to-sequence model and generating a sentence corresponding to the input; and generating expanded text based on the generated sentence.

According to another aspect of the present invention, there is provided a text expansion system configured to automatically expand input text, the text expansion system including a communication module configured to transmit and receive data to and from an external device; a memory configured to store a program for generating expanded text from the input text; and a processor configured to execute the program stored in the memory. By executing the program, the processor extracts a sentence pair that is present in different documents among a plurality of documents when input text composed of the plurality of documents is received, inputs the extracted sentence pair to an encoder of a sequence-to-sequence model, generates a sentence corresponding to the input as an output of a decoder of the sequence-to-sequence model, and generates the expanded text based on the generated sentence.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

The present invention relates to a text expansion system and method that may automatically expand input text.

A text expansion system 100 according to an embodiment of the present invention will be described below with reference to FIGS. 1 to 3.

Figure 1:
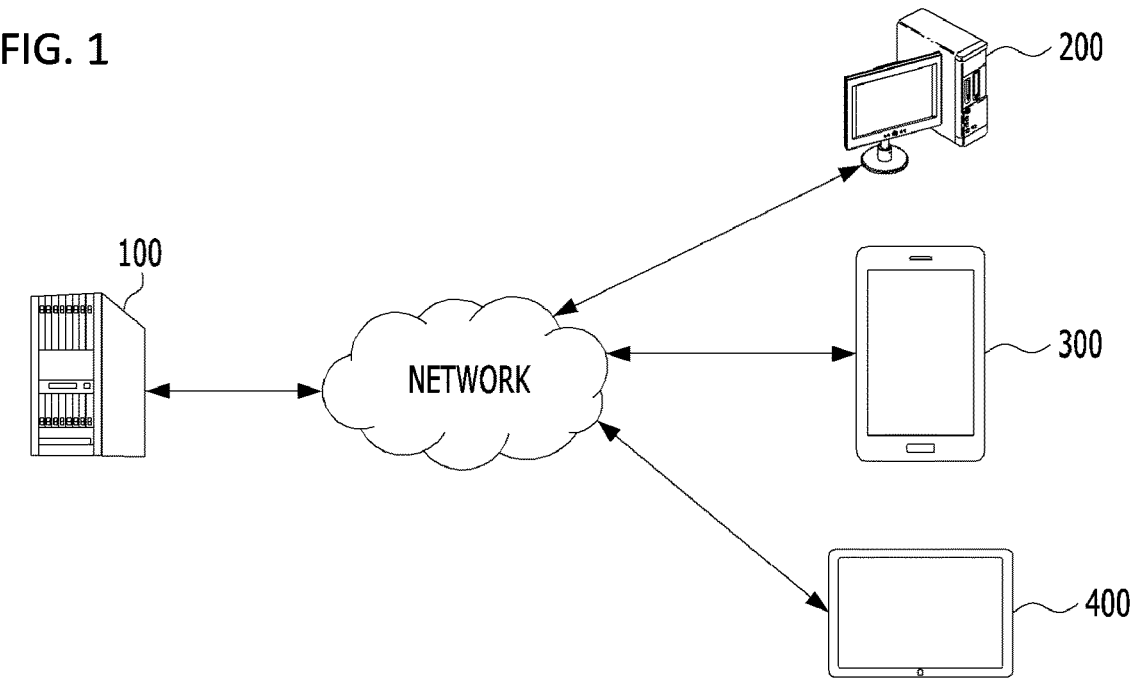
FIG. 1 is a diagram schematically illustrating a text expansion system according to an embodiment of the present invention.

FIG. 1 is a diagram schematically illustrating the text expansion system 100 according to an embodiment of the present invention. FIG. 2 is a block diagram of the text expansion system 100 according to an embodiment of the present invention. FIG. 3 is an example diagram of the text expansion system 100.

The text expansion system 100 according to an embodiment of the present invention may automatically expand input text on the basis of a word chain network technique and a sequence-to-sequence model.

The text expansion system 100 may be connected to external devices 200 to 400 over a network. The network refers to a connection structure capable of exchanging information between nodes such as terminals and servers. Examples of the network include, but are not limited to, a 3rd Generation Partnership Project (3GPP) network, a Long Term Evolution (LTE) network, a World Interoperability for Microwave Access (WIMAX) network, the Internet, a Local Area Network (LAN), a Wireless LAN, a Wide Area Network (WAN), a Personal Area Network (PAN), a Bluetooth network, a satellite broadcasting network, an analog broadcasting network, a Digital Multimedia Broadcasting (DMB) network, etc.

Each of the external devices 200 to 400 may be implemented as a voice recognizer (a) or a machine translator (b) or may be a terminal in which an application for executing such a function is stored. The external devices 200 to 400 may include, for example, a wireless communication device having portability and mobility, that is, any kind of a handheld wireless communication device such as a Personal Communication System (PCS) terminal, a Global System for Mobile communications (GSM) terminal, a Personal Digital Cellular (PDC) terminal, a Personal Handyphone System (PHS) terminal, a Personal Digital Assistant (PDA), an International Mobile Telecommunication (IMT)-2000 terminal, a Code Division Multiple Access (CDMA)-2000 terminal, a W-Code Division Multiple Access (W-CDMA) terminal, and a Wireless Broadband Internet (WiBro) terminal.

Figure 2:
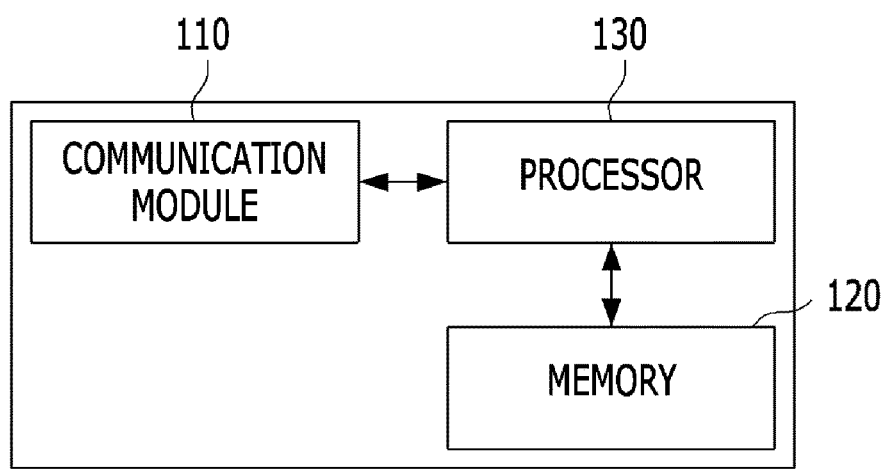
FIG. 2 is a block diagram of a text expansion system according to an embodiment of the present invention.

The text expansion system 100 according to an embodiment of the present invention may be configured as shown in FIG. 2.

The text expansion system 100 according to an embodiment of the present invention includes a communication module 110, a memory 120, and a processor 130.

The communication module 110 transmits and receives data to and from the external devices 200 to 400. The communication module 110 may include both a wired communication module and a wireless communication module. The wired communication module may be implemented as a power line communication device, a telephone line communication device, a cable home (Multimedia over Coax Alliance (MoCA)) module, an Ethernet module, an IEEE1294 module, a wired integrated home network, or an RS-485 controller. Also, the wireless communication module may be implemented as a WLAN module, a Bluetooth module, an HDR WPAN module, a UWB module, a ZigBee module, an Impulse Radio module, a 60 GHz WPAN module, a Binary-CDMA module, a wireless USB module, and a wireless HDMI module.

A program for generating expanded text from input text is stored in the memory 120. Also, databases such as a language model D1, a generated sequence-to-sequence model D4, a word chain candidate list, and a sentence chain list are stored in the memory 120. In this case, the memory 120 collectively refers to a volatile storage device and a non-volatile storage device that holds saved data even when power is turned off.

For example, the memory 120 may include NAND flash memories such as a compact flash (CF) card, a secure digital (SD) card, a memory stick, a solid-state drive (SSD), and a micro SD card, a magnetic computer memory device such as a hard disk drive (HDD), an optical disc drive such as a compact disc read-only memory (CD-ROM) and a digital versatile disc ROM (DVD-DROM), etc.

The processor 130 executes the program stored in the memory 120.

Figure 3:
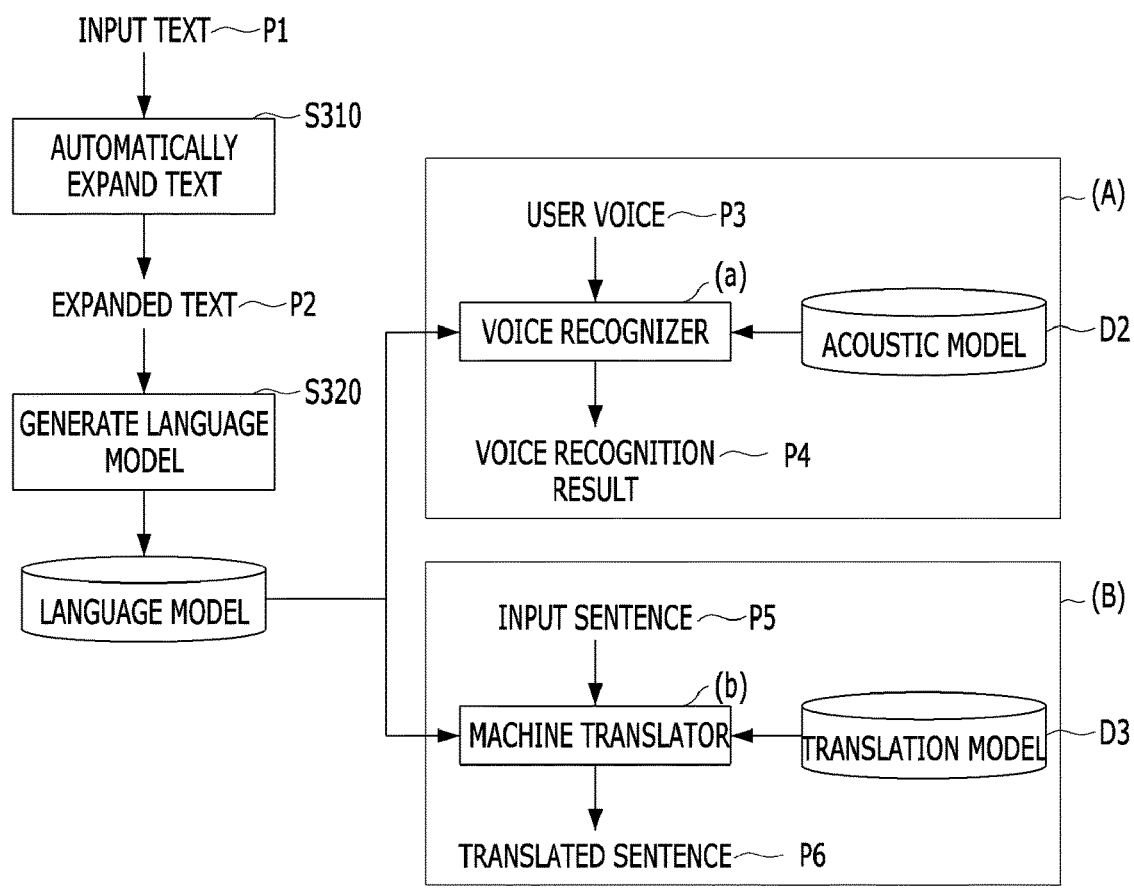
FIG. 3 is an example diagram of a text expansion system.

As shown in FIG. 3, when input text P1 is received, the processor 130 generates expanded text P2 through an automatic text expansion process S310 by executing the program.

The generated expanded text P2 may be generated as the language model D1 through a language model generation process S320, and the generated language model D1 may be utilized in voice recognition technology (A) and machine translation technology (B).

The voice recognizer (a) may output a voice recognition result P4 on the basis of the language model D1 and a prebuilt acoustic model D2 in the case of the voice recognition technology (A). The machine translator (b) may output a translated sentence P6 on the basis of the language model D1 and a prebuilt translation model D3 in the case of the machine translation technology (B).

For reference, the elements according to an embodiment of the present invention illustrated in FIGS. 1 to 3 may each be implemented in the form of software or in the form of hardware such as a field programmable gate array (FPGA) or an application specific integrated circuit (ASIC) and may perform certain functions.

However, the elements are not limited to software or hardware in meaning. In other embodiments, each of the elements may be configured to be stored in a storage medium capable of being addressed, or may be configured to execute one or more processors.

Therefore, for example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and a function provided in corresponding elements may be combined into fewer elements or may be further divided into additional elements.

A method of automatically expanding input text in the text expansion system 100 according to an embodiment of the present invention will be described below in detail with reference to FIGS. 4 to 9.

Figure 4:
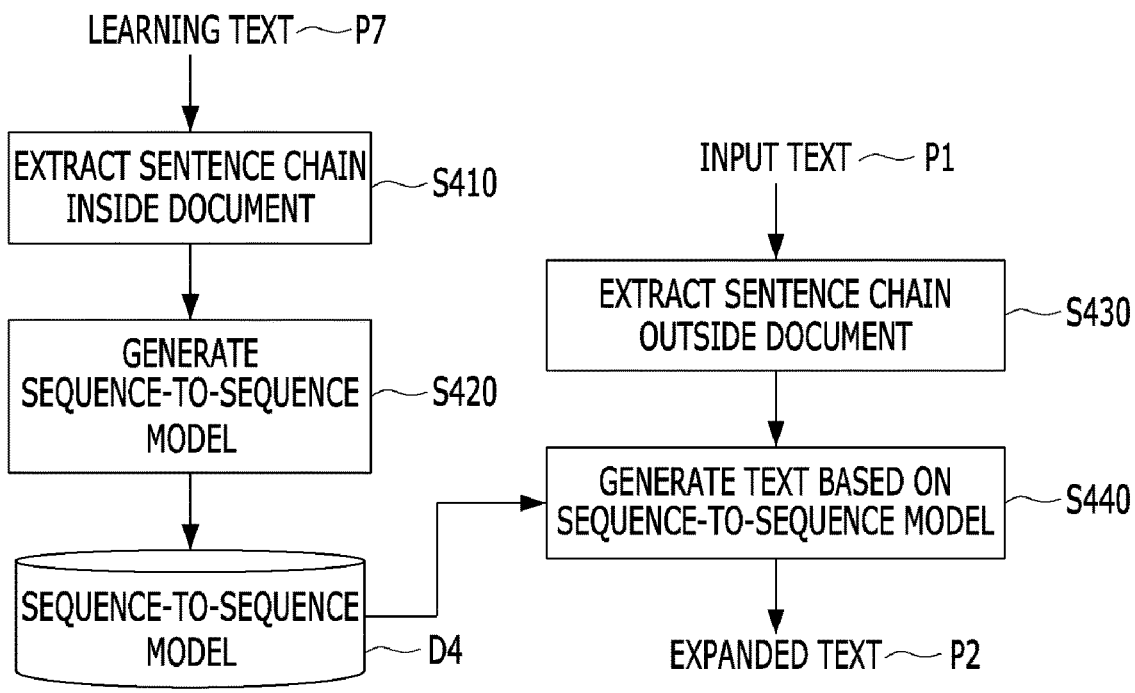
FIG. 4 is a flowchart of a method of automatically expanding input text according to an embodiment of the present invention.
Figure 5:
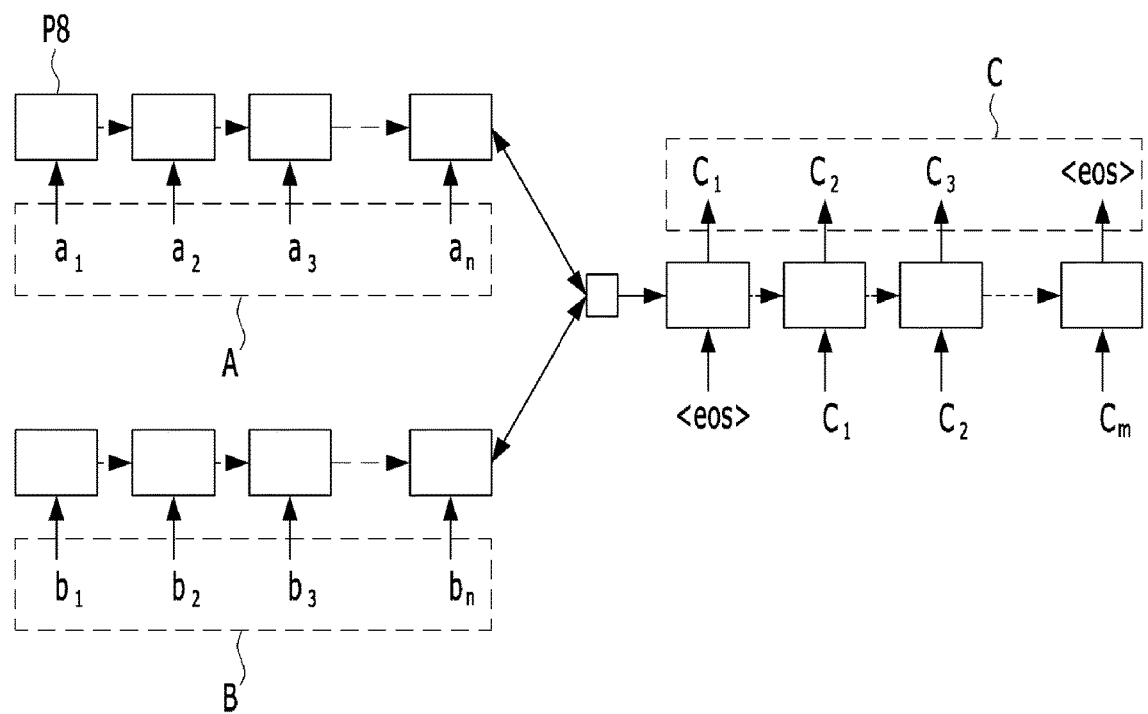
FIG. 5 is a conceptual diagram of a sequence-to-sequence model.
Figure 6:
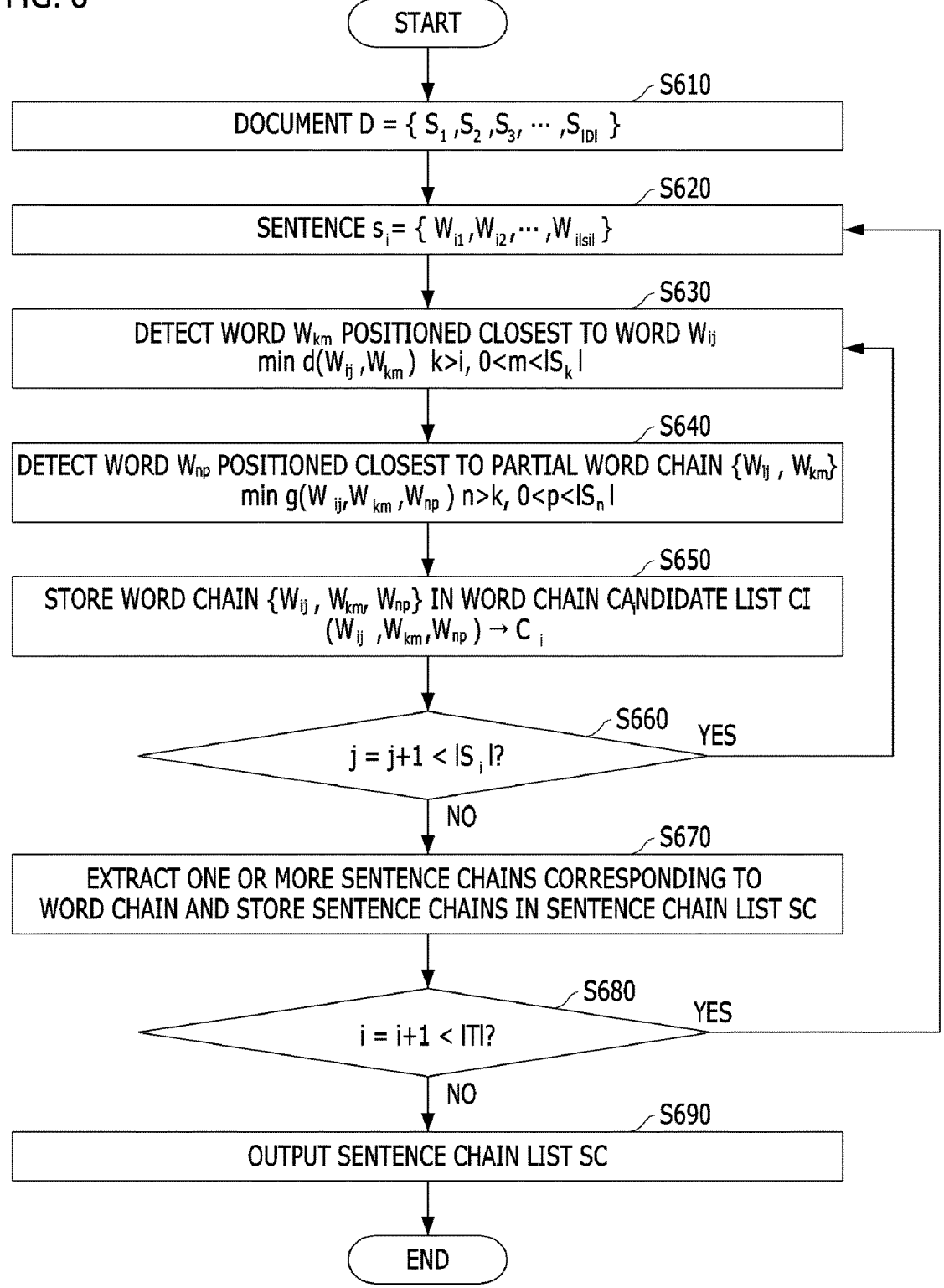
FIG. 6 is a flowchart illustrating a method of extracting a sentence chain from learning text.
Figure 7:
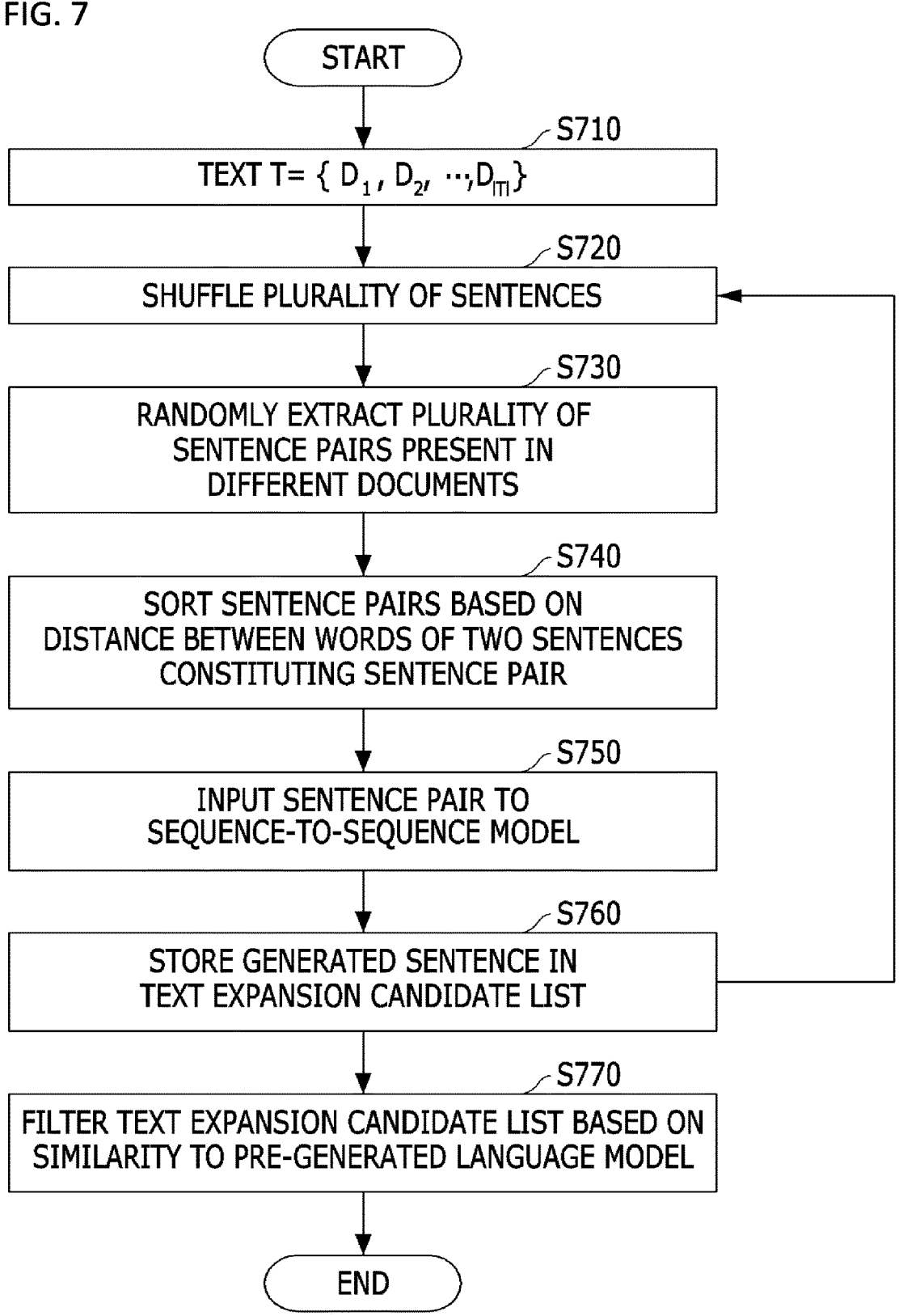
FIG. 7 is a flowchart illustrating a method of generating expanded text from input text through a sequence-to-sequence model.

FIG. 4 is a flowchart of a method of automatically expanding input text according to an embodiment of the present invention. FIG. 5 is a conceptual diagram of a sequence-to-sequence model. FIG. 6 is a flowchart illustrating a method of extracting a sentence chain from learning text. FIG. 7 is a flowchart illustrating a method of generating expanded text from input text through a sequence-to-sequence model.

An automatic expansion method according to an embodiment of the present invention includes extracting a sentence chain from learning text P7 containing a plurality of documents composed of a plurality of sentences through a sentence-chain-inside-document extraction process when the learning text P7 is received (S410). In this case, the sentence chain may be composed of a set including three sentences related to one document. A process of extracting a sentence chain will be described in detail with reference to FIG. 6.

The sentence-chain-inside-document extraction process (S410) is a process of extracting a sentence chain from sentences constituting a document, and a sentence-chain-outside-document extraction process (S430) is a process of extracting a sentence chain between different documents, setting the extracted sentence chain as an input of a sequence-to-sequence model, and generating a new sentence.

Next, the automatic expansion method includes generating the sequence-to-sequence model D4 on the basis of the extracted sentence chain (S420). That is, the sequence-to-sequence model D4 may be generated by setting two of three related sentences included in the extracted sentence chain as an input of an encoder of the sequence-to-sequence model, setting the remaining sentence as an output of a decoder, and then learning the sentences set as the input and output.

For example, it is assumed that the three related sentences are "A," "B," and "C," that sentence "A" and sentence "B" may be set as the input of the encoder of the sequence-to-sequence model, and that sentence "C" may be set as the output of the decoder of the sequence-to-sequence model.

The sequence-to-sequence model generating step corresponds to a learning step. The expanded text P2 for the input text P1 may be generated based on this step.

The automatic expansion method includes performing the sentence-chain-outside-document extraction process on the input text P1 composed of a plurality of documents and extracting a pair of sentences that are present in different documents among the plurality of documents when the input text P1 is received (S430). That is, the pair of sentences "A" and "B" that are semantically relevant but are present in different documents is extracted.

Next, the automatic expansion method includes setting the extracted sentence pair as an input of the encoder of the sequence-to-sequence model D4, setting an output of the encoder as an output of the decoder of the sequence-to-sequence model D4, and generating a sentence corresponding to the input (S440).

For example, a plurality of sentences "C" may be generated as an output of the decoder by setting the pair of input sentences "A" and "B" as an input of the encoder and setting an output of the encoder as an input of the decoder.

The expanded text P2 may be generated on the basis of the generated sentences. In this case, a portion of the generated sentences may be selected and then reflected in the expanded text P2.

A process of extracting a sentence pair and generating the expanded text P2 will be described later in detail with reference to FIG. 7.

Referring to FIG. 5, learning is performed using the sentence "A," the sentence "B," and the sentence "C" as an input in the sequence-to-sequence model generating step S420, and the sentence "C" is generated using the sentence "A" and the sentence "B" as an input in the sequence-to-sequence-model-based text generating step S440. In this case, P8 may be a type of Recurrent Neural Network (RNN) such as Long Short-Term Memory (LSTM) or a Gated Recurrent Unit (GRU).

A method of extracting a sentence chain from learning text will be described below in detail with reference to FIG. 6.

The method of extracting a sentence chain from learning text includes sequentially extracting sentence chains from a plurality of documents included in the learning text. That is, when a sentence chain is extracted from one document, another sentence chain is sequentially extracted from the next document.

First, the sentence chain extraction method includes extracting a word chain from any one sentence $S_i = \{W_{i1}, W_{i2}, \ldots, W_{i|si|}\}$ contained in any one document $D = \{S_1, S_2, S_3, \ldots, S_{|D|}\}$ among a plurality of documents (S610 and S620). In this case, words included in a sentence may be set as vector values through word embedding so that positions thereof may be determined on a vector space on the basis of similarity between contexts thereof. That is, words having similar context are positioned close to each other on the vector space.

The sentence chain extraction method includes detecting a word positioned closest to any one of the words included in the sentence and generating a partial word chain as a word chain extraction step (S630). This is to detect a word $W_{km}$ positioned closest to a word $W_{ij}$ and may be expressed as Equation 1 below:

$$\min d(w_{ij}, w_{km})(k > i, 0 < m < |s_k|) \qquad \text{[Equation 1]}$$

where k is a sentence index, k>i indicates a sentence after a current reference sentence, m is an $m^{th}$ word in a $k^{th}$ sentence, and d is a function for returning a distance between two word vector values.

After the partial word chain is generated, a process of finding a third word of the word chain is performed. The sentence chain extraction method includes detecting a word $W_{np}$, positioned closest to a partial word chain $\{W_{ij}, W_{km}\}$ through the above process and extracting the word $W_{np}$ as a word chain (S640). This may be expressed as Equation 2 below:

$$\min g(w_{ij}, w_{km}, w_{np})(n > k, 0 < p < |s_n|) \qquad \text{[Equation 2]}$$

where n>k, which indicates a sentence index of sentence after a sentence that is selected second, P is a $p^{th}$ word index in an $n^{th}$ sentence, and g is a function for returning a distance among vector values of the three words. The function g can be generalized and expressed as Equation 3 below:

$$g(w_{ij}, w_{km}, w_{np}) = \lambda \cdot d(w_{ij}, w_{np}) + (1-\lambda) \cdot d(w_{km}, w_{np})$$
$$(0 < \lambda < 1) \qquad \text{[Equation 3]}$$

The sentence chain extraction method includes storing a word chain $\{W_{ij}, W_{km}, W_{np}\}$ extracted through the above process in a word chain candidate list $C_i$ (S650).

The extracted word chain $\{W_{ij}, W_{km}, W_{np}\}$ is composed of words (a $j^{th}$ word in sentence i, an $m^{th}$ word in sentence k, and a $p^{th}$ word in sentence n) corresponding to sentence indices i, k, and n. That is, the word chain $\{W_{ij}, W_{km}, W_{np}\}$ may be a specific characteristic of sentences $S_i$, $S_k$, and $S_n$, and may have a distance as expressed using Equation (3).

Next, the sentence chain extraction method includes determining whether a word chain is extracted from all words included in one sentence (S660), increasing a word index in order to extract a word chain from words of the next sentence $S_i$, and then returning to S630.

The sentence chain extraction method includes extracting one or more sentence chains corresponding to a word chain included in the word chain candidate list and storing the extracted sentence chains in a sentence chain list SC (S670) when the word chain is extracted from the words included in the one sentence.

To this end, sentence chains may be sorted to correspond to a word chain selected from among word chains included in the word chain candidate list on the basis of a priority that is based on a predetermined determination criterion, and may then be stored in the sentence chain list.

For example, the word chain $\{W_{ij}, W_{km}, W_{np}\}$ having an optimal value may be selected from the word chain candidate list $C_i$, and one or more sentence chains $\{S_i, S_k, S_n\}$ according to ranking may be stored in the sentence chain list SC.

In this case, the optimal value may be determined on the basis of a distance among words according to Equation (3) above. That is it is determined that the word chain $\{W_{ij}, W_{km}, W_{np}\}$ has the optimal value when a distance $g(W_{ij}, W_{km}, W_{np})$ is smallest. Thus, the sentence chain $\{S_i, S_k, S_n\}$ may be found.

Next, the sentence chain extraction method includes determining whether a sentence chain is extracted from all sentences included in one document (S680), and returning to S620 after increasing an index for the next sentence.

The process includes outputting a sentence chain list corresponding to the document when sentence chains are extracted from all of the sentences by repeating the above process (S690). In this case, the sentence chain extraction method may further include filtering out a sentence chain having a low score.

A method of generating expanded text from input text through a sequence-to-sequence model will be described below with reference to FIG. 7.

The input text is composed of a plurality of documents, each of which is composed of a plurality of sentences (S710). The expanded text generation method includes performing a shuffling process on the plurality of sentences constituting the input text (S720) and then randomly extracting a plurality of sentence pairs that are present in different documents among the plurality of sentences (S730).

The expanded text generation method includes sorting the plurality of sentence pairs on the basis of a distance between words of two sentences constituting each of the sentence pairs (S740).

When the plurality of sentence pairs are sorted, the sorted sentence pairs are set as an input of the encoder of the sequence-to-sequence model in the order of sorting. That is, a sentence pair sorted as Top 1 is set as an input of the encoder first, and the setting is performed until a sentence pair is sorted as Top n.

The expanded text generation method includes setting an output of the encoder as an output of the decoder and generating a sentence corresponding to the input when the sentence pairs are set as the input of the encoder (S750) and storing the generated sentence in a text expansion candidate list (S760).

Next, after the generated sentence is stored in the text expansion candidate list, step S720 is repeatedly performed on a plurality of sentences including the generated sentence until the sentence pair sorted as Top n becomes a target.

Finally, the expanded text generation method includes filtering the text expansion candidate list on the basis of similarity to a pre-generated language model and then generating the filtered text expansion candidate list as expanded text (S770).

The method of automatically expanding input text according to an embodiment of the present invention may expand a word chain network technique through an N-hop model obtained by introducing a neural network model to a sentence chain extraction model. That is, according to an embodiment of the present invention, a sentence chain network based a word chain network may be modeled through the N-hop model. This will be described below with reference to FIGS. 8 and 9.

Figure 8:
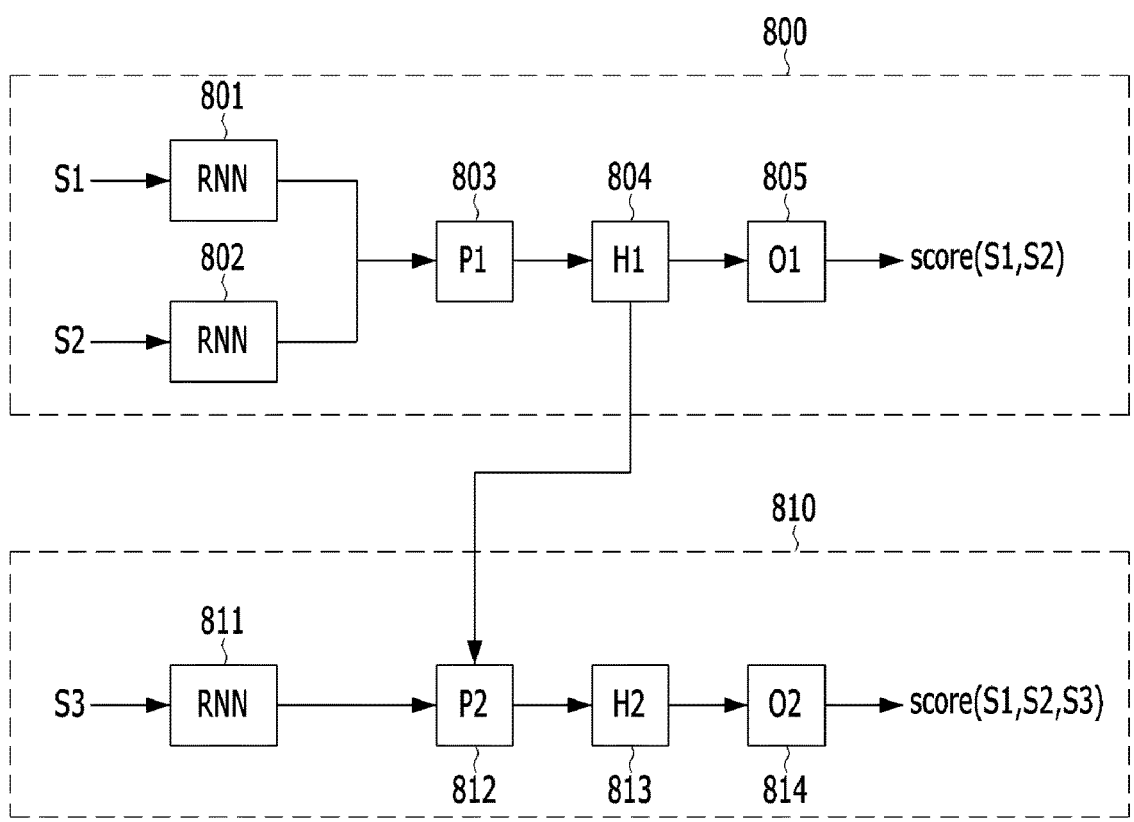
FIG. 8 is a conceptual diagram of an N-hop model.
Figure 9:
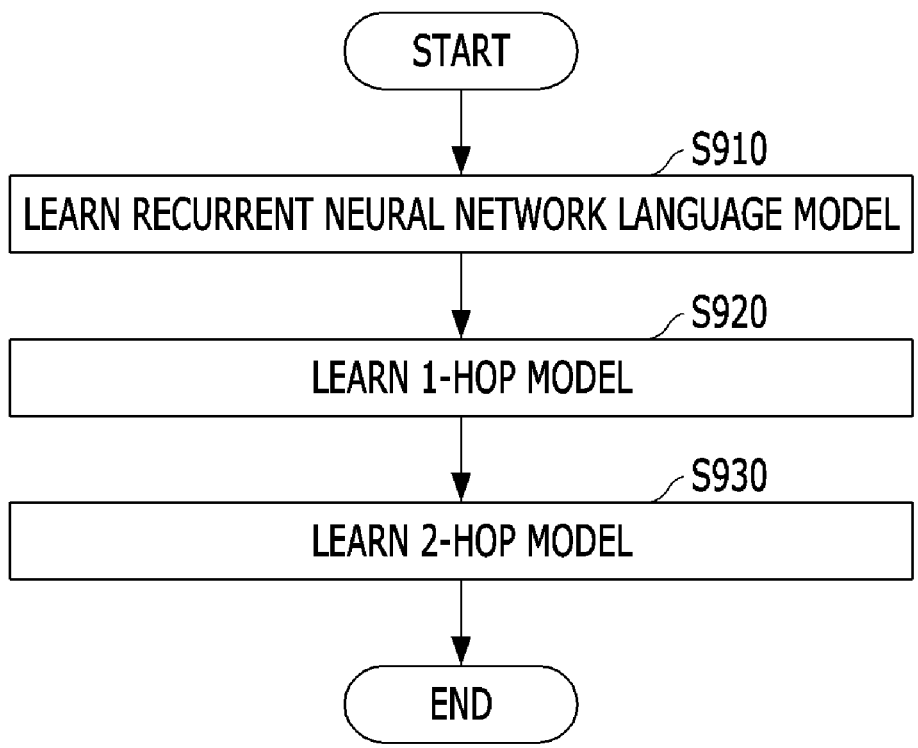
FIG. 9 is a flowchart illustrating a learning process of an N-hop model.

FIG. 8 is a conceptual diagram of an N-hop model. FIG. 9 is a flowchart illustrating a learning process of an N-hop model.

In detail, the N-hop model may be substituted for the function d for calculating a distance between two words and the function g for calculating a distance among three words that are described with reference to FIG. 6. The function d and the function g may be utilized for a word chain generation method that uses word embedding, while the N-hop model may directly generate a sentence chain for sentences.

Also, the sentence chain generated according to the method of FIG. 6 may be used as learning data for learning the N-hop model.

The N-hop model may be substituted for S630 to S670 of FIG. 6 and S740 of FIG. 7 and then applied to the text expansion method.

Referring to FIGS. 8 and 9, the N-hop model may perform learning in three steps.

First, a recurrent neural network language model is learned for sentence embedding (S910). In this case, the recurrent neural network language model may be any one of LSTM and GRU. Reference numbers 801, 802, and 811 of FIG. 8 are the same recurrent neural network language model, and may be used to perform the sentence embedding.

Next, a 1-hop model is learned (S920). That is, by using a sentence chain A={S1, S2} including two sentences constituting a sentence pair and a counter sentence chain B={S1, S2' } corresponding to the sentence chain, a 1-hop model configured to classify a sentence chain and a counter sentence chain is learned.

The learned 1-hop model may configure an embedded sentence through layer P1 803 and layer H1 804 as a deep neural network model and may obtain a resultant value to determine a sentence chain through layer O1 805.

The 1-hop model may be applied to S740 of FIG. 7. Thus, a plurality of sentence pairs may be sorted on the basis of the 1-hop model.

Next, a 2-hop model is learned (S930). That is, by using a sentence chain A={S1, S2, S3} including three related sentences and a counter sentence chain B={S1, S2, S3' } corresponding to the sentence chain, the 2-hop model configured to classify a sentence chain and a counter sentence chain is learned.

The learned 2-hop model may have an output value of layer H1 804 of the 1-hop model and the embedded sentence S3 that is not include in the sentence pair as an input of layer P2 812, and may obtain a resultant value to determine a sentence chain through layer H2 813 and layer O2 814.

Here, layer P1 803, layer P2 812, layer H1 804, and layer H2 813 are fully-connected layers that are used in a neural network, and layer O1 805 and layer O2 814 are softmax layers for obtaining probabilities.

Layer P1 803 has a result of two RNNs 801 and 802 for embedding two sentences as an input and serves to convert the result into an input value of layer H1 804. Also, layer P2 812 has an output value of layer H1 804 and an output value of RNN 811 of the third sentence S3 as an input and serves to convert the resultant values into an input value of layer H2 813.

A similarity probability value score (S1, S2) of the two sentences S1 and S2 is output by using the output value of layer H1 804 as an input of layer O1 805, and a similarity probability value score (S1, S2, S3) of the three sentences S1, S2, and S3 is output by processing the output value of layer H2 813 as an input of layer O2 814.

In the above description, steps S410 to S930 may be further divided or combined according to implementations of the present invention. Also, some steps may be omitted or the order of the steps may be changed if needed. Furthermore, the above descriptions in FIGS. 1 to 3 may be applied to the method of automatically expanding input text in FIGS. 4 to 9 even though the descriptions are omitted.

According to an embodiment of the present invention, it is possible to improve performance through language modeling of voice recognition and machine translation by utilizing text corpus expansion technology that uses sentence chain extraction.

Also, it is possible to improve performance of a summary system by expanding word chain network extraction technology used for document summarization to include automatic document chain extraction technology based on a deep-neural-network-based N-hop model.

According to an embodiment of the present invention, it is possible to improve performance through language modeling of voice recognition and machine translation by utilizing text corpus expansion technology that uses sentence chain extraction.

Also, it is possible to improve performance of a summary system by expanding word chain network extraction technology used for document summarization to include automatic document chain extraction technology based on a deep-neural-network-based N-hop model.

The system 100 according to an exemplary embodiment of the present invention may be embodied as a computer program stored in a medium run by a computer or a recording medium storing instructions which are executable by a computer. A non-transitory computer-readable recording medium may be any available medium accessible by a computer. Examples of the non-transitory computer-readable recording medium include a volatile/non-volatile medium and a separable/non-separable medium. Examples of the non-transitory computer-readable recording medium may include a computer storage medium and a communication medium. Examples of the computer storage medium include a volatile/nonvolatile medium and a separable/non-separable medium embodied according to a method or technique of storing information such as computer-readable instructions, data structures, program modules, or other data. The communication medium should be generally understood to include computer-readable instructions, data structures, program modules, other data, e.g., modulated data signals such as subcarriers, or other transfer mechanisms. An example of the communication medium includes any information transfer medium.

Although the system 100 according to an exemplary embodiment of the present invention has been described above with respect to certain exemplary embodiments, some or all of elements or operations of the method and system may be realized by a computer system having a general-purpose hardware architecture.

The above description of the present invention is merely an example. It would be apparent to those of ordinary skill in the art that the present invention may be easily embodied in many different forms without changing the technical idea or essential features thereof. Thus, the above exemplary embodiments are merely examples and the present invention is not limited thereto. For example, elements of the exemplary embodiments described herein as being included in a single device may be dispersed. Similarly, elements of the exemplary embodiments described herein as being dispersed may be combined.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of automatically expanding input text, the method comprising:
receiving input text composed of a plurality of documents;
extracting a sentence pair that is present in different documents among the plurality of documents;
setting the extracted sentence pair as an input of an encoder of a sequence-to-sequence model;
setting an output of the encoder as an output of a decoder of the sequence-to-sequence model and generating a sentence corresponding to the input; and
generating expanded text based on the generated sentence,
wherein the extracting of a sentence pair that is present in different documents among the plurality of documents comprises:
randomly extracting a plurality of sentence pairs that are present in different documents among the plurality of documents; and
sorting the plurality of sentence pairs based on a distance between words of two sentences constituting each of the plurality of sentence pairs.

2. The method of claim 1, further comprising:
receiving learning text including a plurality of documents composed of a plurality of sentences;
extracting a sentence chain from the learning text; and
generating the sequence-to-sequence model, based on the extracted sentence chain, wherein
the sentence chain is composed of a set including three sentences related to one document.

3. The method of claim 2, wherein the extracting of a sentence chain from the learning text comprises extracting the sentence chain from each of the plurality of documents included in the learning text in sequence.

4. The method of claim 3, wherein the extracting of a sentence chain from the learning text comprises:
extracting a word chain from one sentence included in one of the plurality of documents;
storing the extracted word chain in a word chain candidate list;
determining whether the word chain is extracted from all words included in the one sentence;
extracting at least one sentence chain corresponding to the word chain included in the word chain candidate list and storing the extracted sentence chain in a sentence chain list when the word chain is extracted from all of the words;
determining whether the sentence chain is extracted from all sentences included in the one document; and outputting a sentence chain list corresponding to the document when the sentence chain is extracted from all of the sentences.

5. The method of claim 4, wherein:
the words included in the sentence are set as a vector value through word embedding; and
positions of the words on a vector space are determined based on similarity between contexts thereof.

6. The method of claim 5, wherein the extracting of a word chain comprises:
detecting a word positioned closest to any one of the words included in the sentence on the vector space to generate a partial word chain; and
detecting a word positioned closest to the partial word chain on the vector space to extract the word chain.

7. The method of claim 4, wherein the extracting and storing of at least one sentence chain in a sentence chain list comprises sorting the sentence chain to correspond to a word chain selected from among word chains included in the word chain candidate list based on a priority that is based on a predetermined determination criterion and storing the sorted sentence chain in the sentence chain list.

8. The method of claim 2, wherein the generating of the sequence-to-sequence model comprises:
selecting a sentence chain for any one of the plurality of documents included in the learning text;
setting two of the three related sentences included in the sentence chain as the input of the encoder of the sequence-to-sequence model and setting the remaining sentence as the output of the decoder; and
learning the sentences set as the input and output to generate the sequence-to-sequence model.

9. The method of claim 1, wherein the extracting of a sentence pair that is present in different documents among the plurality of documents comprises:
sorting the plurality of sentence pairs based on a distance between words of two sentences constituting each of the plurality of sentence pairs.

10. The method of claim 1, wherein the setting of the extracted sentence pair as an input of an encoder of a sequence-to-sequence model comprises setting the sorted sentence pairs as the input of the encoder in sorting order.

11. The method of claim 10, wherein the generating of expanded text based on the generated sentence comprises:
storing the generated sentence in a text expansion candidate list;
filtering the text expansion candidate list based on similarity to a pre-generated language model; and
generating the filtered text expansion candidate list as the expanded text.

12. The method of claim 11, further comprising shuffling the plurality of sentences included in the input text, wherein
after the generated sentence is stored in the text expansion candidate list and then included in the plurality of sentences, the shuffling is performed on the plurality of sentences.

13. The method of claim 2, wherein the extracting of a sentence pair that is present in different documents among the plurality of documents comprises:
embedding the extracted sentence pair based on a pre-learned recurrent neural network language model and expressing the embedded sentence pair as a vector; and
learning a 1-hop model configured to use a sentence chain including two sentences constituting the sentence pair and a counter sentence chain corresponding to the sentence chain to classify the sentence chain and the counter sentence chain, wherein
the 1-hop model configures the embedded sentence through layer P1 and layer H1 as a deep neural network model and obtains a resultant value to determine the sentence chain through layer O1.

14. The method of claim 13, wherein the extracting of a sentence pair that is present in different documents among the plurality of documents comprises:
randomly extracting a plurality of sentence pairs that are present in different documents among the plurality of documents; and
sorting the plurality of sentence pairs based on the 1-hop model.

15. The method of claim 13, further comprising learning a 2-hop model configured to use a sentence chain including the three related sentences and a counter sentence chain corresponding to the sentence chain to classify the sentence chain and the counter sentence chain, wherein
the 2-hop model has an output value of the layer H1 of the 1-hop model and an embedded sentence that is not included in the sentence pair as an input of layer P2 and obtains a resultant value to determine the sentence chain through layer H2 and layer O2.

16. The method of claim 13, wherein the recurrent neural network language model is any one of a Long Short-Term Memory (LSTM) and a Gated Recurrent Unit (GRU).

17. A text expansion system configured to automatically expand input text, the text expansion system comprising:
a communication module configured to transmit and receive data to and from an external device;
a memory configured to store a program for generating expanded text from the input text; and
a processor configured to execute the program stored in the memory, wherein,
by executing the program, the processor extracts a sentence pair that is present in different documents among a plurality of documents when input text composed of the plurality of documents is received, inputs the extracted sentence pair to an encoder of a sequence-to-sequence model, generates a sentence corresponding to the input as an output of a decoder of the sequence-to-sequence model, and generates the expanded text based on the generated sentence, and
wherein, by the executing program, the processor selects a sentence chain for any one of the plurality of documents included in the learning text and sets two of the three related sentences included in the sentence chain as the input of the encoder of the sequence-to-sequence model.

18. The text expansion system of claim 17, wherein:
when learning text including a plurality of documents composed of a plurality of sentences is received through the communication module, the processor is configured to extract a sentence chain from the learning text and generate the sequence-to-sequence model based on the extracted sentence chain; and
the sentence chain is composed of a set including three sentences related to one document.

19. The text expansion system of claim 18, wherein:
the processor extracts a word chain from one sentence included in one of the plurality of documents constituting the learning text and stores the extracted word chain in a word chain candidate list;
the processor extracts at least one sentence chain corresponding to the word chain included in the word chain candidate list and stores the extracted sentence chain in a sentence chain list when the word chain is extracted from all words included in the one sentence; and the processor outputs a sentence chain list corresponding to the document when the sentence chain is extracted from all sentences included in the one document.

20. The text expansion system of claim 18, wherein the processor sets the remaining sentence as the output of the decoder and learns the sentences set as the input and output to generate the sequence-to-sequence model.

* * * * *